United States Patent [19]

Oxley et al.

[11] 3,856,956

[45] Dec. 24, 1974

[54] 17-ACYLOXYSTEROIDS AND THEIR MANUFACTURE

[75] Inventors: Peter Oxley; John Rosindale Housley, both of Nottingham, England

[73] Assignee: Boots Pure Drug Company Limited, Nottingham, England

[22] Filed: Jan. 28, 1972

[21] Appl. No.: 221,812

Related U.S. Application Data

[62] Division of Ser. No. 613,454, Feb. 2, 1967, Pat. No. 3,639,434.

[52] U.S. Cl. ............... 424/243, 260/397.45, 195/51
[51] Int. Cl. ........................................... A61k 17/00
[58] Field of Search .............................. 260/397.45

[56] References Cited
UNITED STATES PATENTS

| | | | |
|---|---|---|---|
| 2,912,446 | 11/1959 | Sarett | 260/397.45 |
| 3,506,694 | 4/1970 | Oxley | 260/397.45 |
| 3,763,196 | 10/1973 | Gardi et al. | 260/397.45 |

OTHER PUBLICATIONS

McKenzie et al., Archives of Dermatology, Vol. 89, page 744, 1964.

*Primary Examiner*—Elbert L. Roberts
*Attorney, Agent, or Firm*—Larson, Taylor & Hinds

[57] ABSTRACT

The invention concerns novel steroids having valuable properties as anti-inflammatory agents in veterinary and human medicine.

The new steroids are 21-desoxyprednisolone 17α-propionate, -butyrate and -isobutyrate. They are particularly valuable for topical application.

8 Claims, No Drawings

17-ACYLOXYSTEROIDS AND THEIR MANUFACTURE

This application is a division of parent application Ser. No. 613,454 filed Feb. 2, 1967, now U.S. Pat. No. 3,639,434.

The invention relates to the novel steroids 21-desoxyprednisolone 17α-propionate, -butyrate and -isobutyrate, to therapeutic compositions containing them, and to a method of treating inflammation, especially inflammation of the skin in animals including man.

According to one feature of the invention there are provided compounds of formula I

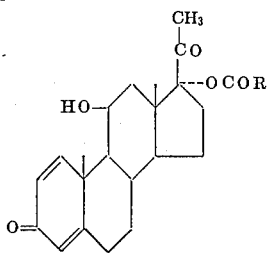

in which R is ethyl, n-propyl or isopropyl.

The compounds of the invention may be prepared by a process which comprises treating a compound of formula II

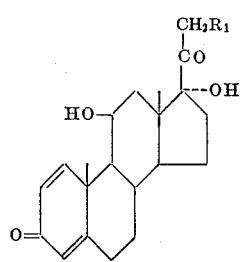

wherein $R_1$ is chlorine, bromine, alkanesulphonyloxy or arenesulphonyloxy with acetyl nitrate to give a compound of formula III

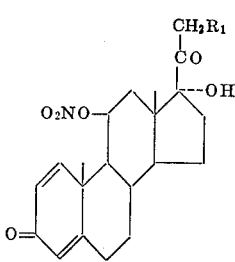

and thereafter a. replacing the group $R_1$ by hydrogen, then converting the 17α-hydroxy group into the group OCOR and finally reducing the 11β-nitrate group to an 11β-hydroxy group; or b. converting the 17α-hydroxy group into the group OCOR, then reducing the 11β-nitrate group to an 11β-hydroxy group and finally replacing the group $R_1$ by hydrogen; or c. converting the 17α-hydroxy group into the group $OCOR_1$, then replacing the group $R_1$ by hydrogen and finally reducing the 11β-nitrate group to an 11β-hydroxy group.

Under certain reaction conditions replacement of the $R_1$ group by hydrogen and reduction of the 11β-nitrate group in steps (b) and (c) may take place simultaneously.

According to another feature of the invention there are provided therapeutic compositions containing as active ingredient a compound of formula I in association with a pharmaceutically acceptable diluent or carrier.

The intermediates prednisolone 11β-nitrate and those of formula IV

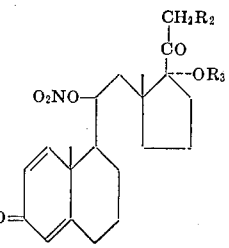

in which $R_2$ is hydrogen or bromine and $R_3$ is hydrogen or the group COR are also novel compounds.

The nitrate ester group of compounds of formula III is introduced by the action of acetyl nitrate, a reagent produced by mixing fuming nitric acid with acetic acid; said ester group is most conveniently transformed into hydroxy by reduction with zinc and acetic acid.

The acylation of the 17α-hydroxy group may be achieved by reaction with an acid anhydride $(RCO)_2O$ or an acid halide RCOX where X is chlorine or bromine in the presence of a suitable strong acid catalyst. The preferred catalyst is p-toluene sulphonic acid but acids such as perchloric acid are also suitable. The acylation may also be catalysed by bases such as triethylamine. Another method of acylation employs an alkanoic acid RCOOH in the presence of trifluoroacetic anhydride.

The group $R_1$ is replaced by hydrogen using conventional methods. For example, a preferred group is the methanesulphonyloxy group which is readily reduced with sodium iodide and acetic acid. When $R_1$ is chlorine or bromine, the halogen may be replaced by hydrogen using zinc and acetic acid.

The compounds of formula I have been found to have valuable anti-inflammatory activity and to be particularly valuable for topical application. For example we have tested 21-desoxyprednisolone 17α-propionate by the McKenzie test (*Archives of Dermatology*, 1962, 86, 608–610) and found it to be several times as active as triamcinolone acetonide, a commercially available steroid for topical application. The unacylated steroid, 21-desoxyprednisolone, however, is virtually inactive in the McKenzie test.

In the following typical reaction schemes, the preparation of the compounds of the invention is illustrated.

The compound VI may be converted into the 11-nitrate VII by treatment with acetyl nitrate. This compound may be converted into the 21-desoxy compound VIII, which in turn is acylated to give the 17-acylate IX. This compound may also be prepared by converting compound VII into the 17-acylate X, and subsequently treating with sodium iodide in acetic acid to give the compound IX. Compound IX is finally converted into compound XI by treatment with zinc dust and acetic acid. Compound X may also be reduced with zinc and acetic acid to give compound XII which gives compound XI when treated with sodium iodide in acetic acid. In another modification, prednisolone 21-acetate (XIII) may be converted into the 11β-nitrate (XIV) which is then hydrolysed to prednisolone 11β-nitrate (XV). Compound XV is converted into compound VIII by reaction with methanesulphonyl chloride in the presence of a base such as pyridine. Compound X may be converted into the corresponding 21-iodide which may be reduced to compound IX with aqueous sodium bisulphite or directly to compound XI using zinc dust and acetic acid. Similarly, compound XII may be converted into the corresponding 21-iodide which may be reduced to compound XI.

In an alternative process prednisolone 17-acylates (XVI) are converted into the 21-methane-sulphonates (XII) which are treated with sodium iodide and acetic acid to give the corresponding 21-desoxy-17acylates (XI). Alternatively, the compounds XII may be converted into the 21-chloro-compounds (XVII) by treatment with lithium chloride in dimethylformamide; these compounds are reduced, for example with zinc dust and acetic acid, to give the compounds XI.

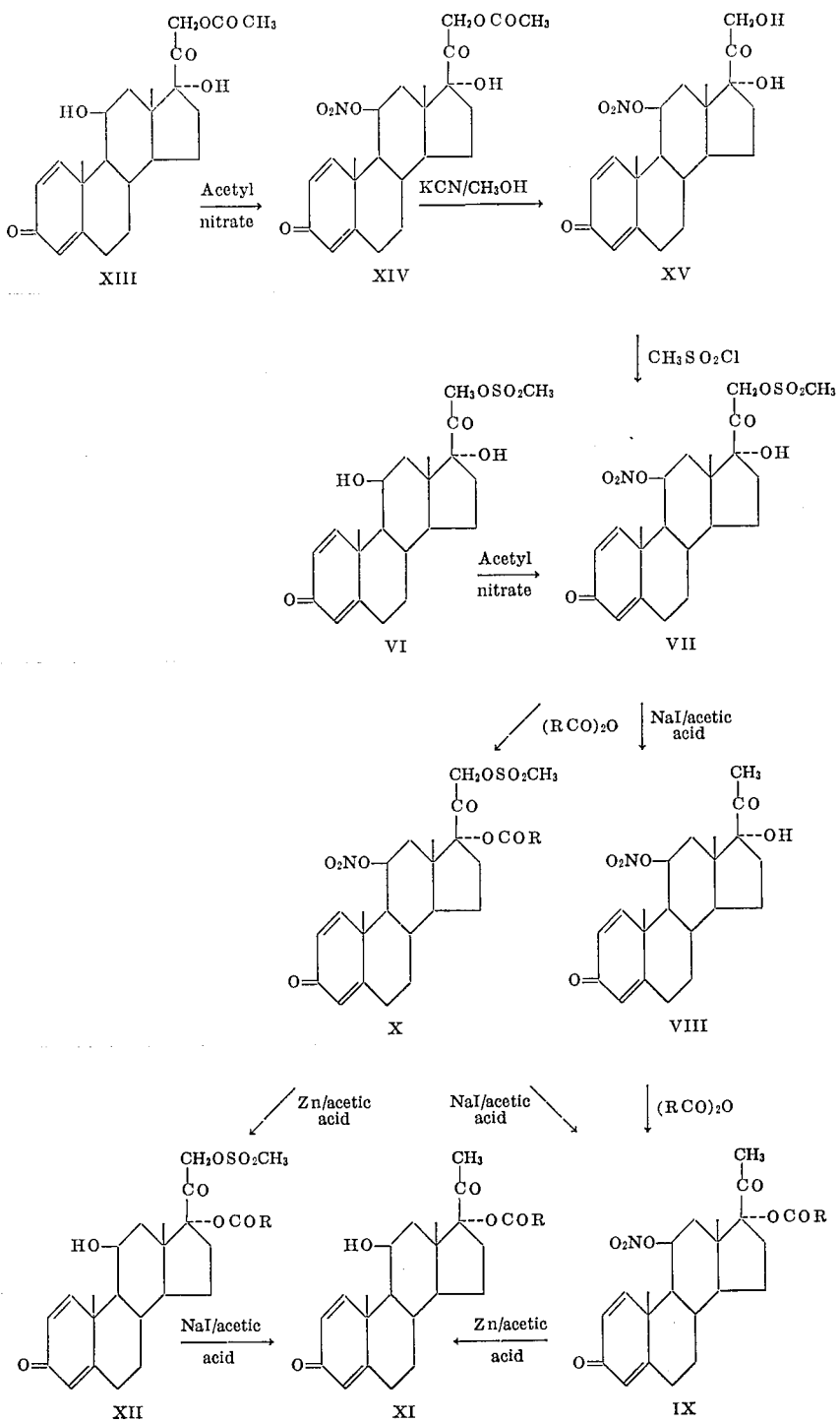

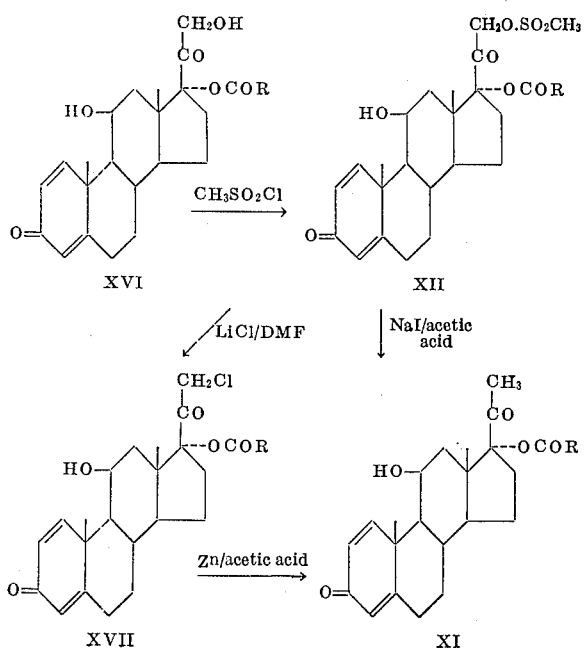

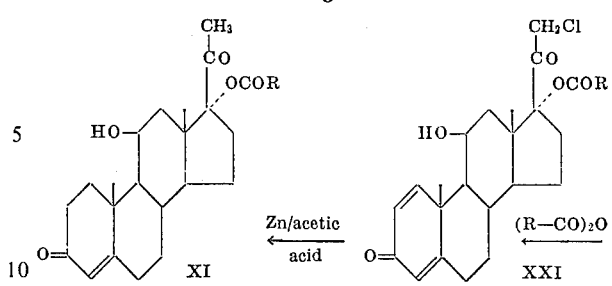

In a further process compounds of the general formula XI may be prepared by reduction of a 9α-halo-compound (XX11) with chromous acetate in the presence of an alkane thiol and preferably in dimethylsulphoxide as solvent.

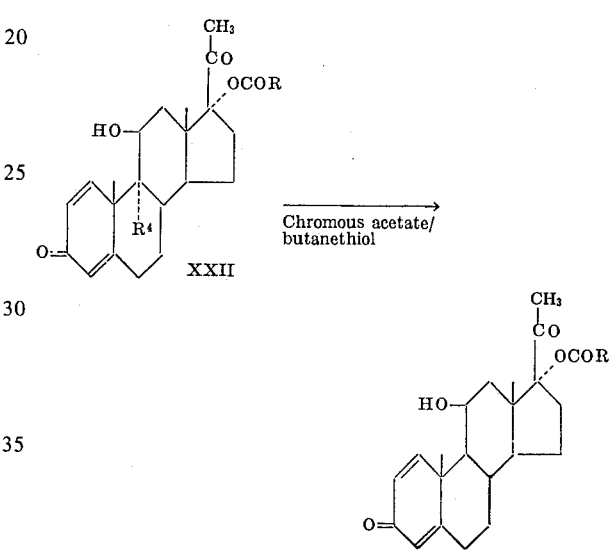

In another method of preparation, prednisolone (XV111) is converted into its 21-methanesulphonate (VI) which is treated with lithium chloride in dimethylformamide to give the corresponding 21-chloro-compound (XIX). Treatment with acetyl nitrate gives the 11-nitrate (XX) which is treated with an acid anhydride (R—CO)$_2$O in the presence of p-toluenesulphonic acid to give the 17-esters (XXI). Reduction with zinc dust and acetic acid gives the corresponding 21-desoxy-17-acylates (XI). Prednisolone 21-bromide may be converted into the 21-desoxy-17-acylates (XI) by a similar process.

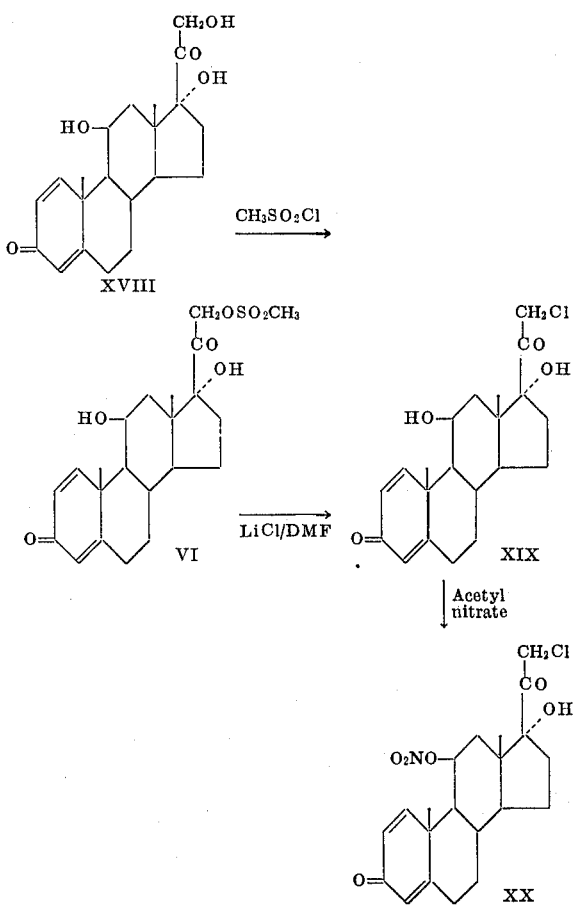

where R$^4$ is chloride or bromine and R is as hereinbefore defined.

As a further alternative, similar reactions to those hereinbefore described may be used starting with a Δ$^1$-steriod instead of a Δ$^{1,4}$-steroid. The intermediates and final products are then dehydrogenated at C$_1$ and C$_2$ by conventional means; for example (a) by microbiological oxidation using organisms such as *Corynebacterium simplex*, *Bacillus sphaericus* and *Septomyxa affinis*, or (b) by chemical oxidation using for example 2,3-dichloro-5,6-dicyanobenzoquinone.

The preferred compositions according to the present invention comprising a compound of general formula I in association with a pharmaceutically acceptable diluent are those adapted for topical application although the invention is not to be considered to be limited to such compositions. Such compositions may be in the form of liquid solutions or suspensions or in the form of semi-solid creams and ointments.

The compositions may also contain additional therapeutic agents which are compatible with the compounds of general formula I and which are pharmaceutically acceptable. Particularly valuable additional therapeutic agents include antibacterial agents such as neomycin, 2-bromo-2-nitropropane-1,3-diol, 5-chloro-8-hydroxy-7-iodoquinoline and 5,7-dichloro-8-hydroxyquinoline.

The following non-limitative examples illustrate the invention. For convenience, Trade Names are used for certain materials and these are identified as follows:

| | |
|---|---|
| Florisil | Registered Trade Mark for a synthetic magnesia/silica gel adsorbent. |
| Kieselgel G | A Trade Name for a silica gel adsorbent. |
| Polawax | A Trade Name for a polyoxyethylene sorbitan ester emulsifying agent. |
| Freon 11 | A Trade Name for the propellant trichlorofluoromethane. |
| Freon 12 | A Trade Name for the propellant dichlorodifluoromethane. |
| Freon 114 | A Trade Name for the propellant 1,2-dichloro-1,1,2,2-tetrafluoroethane. |

The content of the ingredients of compositions is percent w/w unless there is a statement to the contrary.

EXAMPLE 1

Prednisolone 21-methanesulphonate (10 g.) was added to a stirred solution of acetyl nitrate at 0°C. prepared from glacial acetic acid (100 ml.) acetic anhydride (100 ml.) and fuming nitric acid (20 ml.). The steroid had dissolved after 1½ hours and after 4 hours the mixture was poured into ice/water (1,000 ml.). The product was collected in methylene chloride, the extract was washed with water, dried and evaporated. The residue was crystallised from benzene to give a benzene solvate of prednisolone 21-methanesulphonate 11$\beta$-nitrate, m.p. 175°–177°C. (dec.).

Prednisolone 21-methanesulphonate 11$\beta$-nitrate (4 g.) dissolved in acetic acid (80 ml.) was stirred with sodium iodide (8 g.) at room temperature for 1 hour. 5 percent sodium bisulphite solution (80 ml.) was added to the mixture followed by water (80 ml.) until a slight turbidity was apparent. The product crystallised on seeding to give 21-desoxyprednisolone 11$\beta$-nitrate, m.p. 144°–145°C. (dec.). It was used for esterification without further purification.

Toluene-p-sulphonic acid (50 mg.) was dissolved in isobutyric anhydride (2 ml.), 21-desoxyprednisolone 11$\beta$-nitrate (500 mg.) was added and the suspension was warmed to 80°C. for 30 minutes. The clear solution was cooled and the crystals which separated were collected and washed with ether to give 21-desoxyprednisolone 17$\alpha$-isobutyrate 11$\beta$-nitrate, m.p. 195°–196°C (dec.), $[\alpha]_D^{30}$ 76.1° (chloroform). (Found: C, 65.5; H, 7.1. $C_{25}H_{33}NO_7$ requires C, 65.3; H, 7.2 percent).

The above compound (400 mg.) was dissolved in acetic acid (20 ml.) and stirred for 15 minutes with zinc dust (2.g.). The mixture was filtered, the filtrate was diluted with water and the product was collected in benzene. The solution was washed with water, evaporated to dryness and the residue was triturated with ether. Further purification by chromatography gave 21-desoxyprednisolone 17$\alpha$-isobutyrate, m.p. 220°–221°C., $[\alpha]_D$ + 33.2° (chloroform).

(Found: C, 72.4; H, 8.4. $C_{25}H_{34}O_5$ requires C, 72.4; H, 8.3%).

In a similar way there were prepared:
21-Desoxyprednisolone 11$\beta$-nitrate 17$\alpha$-propionate, m.p. 205°C. (dec.). $[\alpha]_D$ + 69.5° (chloroform).
21-Desoxyprednisolone 17$\alpha$-propionate, m.p. 228°–229°C., $[\alpha]_D$ + 34.0° (chloroform).
(Found: C, 72.0; H, 8.2. $C_{24}H_{32}O_5$ requires C, 72.0; H, 8.0%).

EXAMPLE 2

Prednisolone 17$\alpha$-butyrate, m.p. 217°–219°C., $[\alpha]_D^{22}$ + 1.2° (dioxan, $c$ = 0.825) was treated with methanesulphonyl chloride to give prednisolone 17$\alpha$-butyrate 21-methanesulphonate, m.p. 120°–123°C., $[\alpha]_D^{26}$ + 26° (dioxan, $c$ = 1.4).

(Found: C, 61.0; H, 7.2. $C_{26}H_{36}O_8S$ requires C, 61.4; H, 7.1%) which was treated with sodium iodide and acetic acid to give 21-desoxyprednisolone 17$\alpha$-butyrate, m.p. 232°–235°C., $[\alpha]_D^{21}$ + 36° (chloroform, $c$ = 0.3).

(Found: C, 72.2; H, 8.3. $C_{25}H_{34}O_5$ requires C, 72.45; H, 8.3%).

Prednisolone 17$\alpha$-butyrate was prepared from prednisolone via prednisolone 17$\alpha$,21-methyl orthobutyrate.

EXAMPLE 3

21-Desoxyprednisolone 11$\beta$-nitrate 17$\alpha$-propionate (445 mg.) was suspended in dry methanol (45 ml.) and the suspension was added to a pre-reduced suspension of palladium oxide (80mg.) in dry methanol (10ml.). The mixture was shaken under hydrogen when 16 ml. was absorbed in 30 minutes. The mixture was filtered, and the filtrate was evaporated to give a gum which was shown to contain 21-desoxyprednisolone 17$\alpha$-propionate by thin layer chromatography.

EXAMPLE 4

A solution of 21-desoxyprednisolone 11$\beta$-nitrate 17$\alpha$-propionate (0.5 g.) in methylene chloride (25 ml.) was stirred at reflux temperature with tin (2.5 g.) and concentrated hydrochloric acid for 5½ hours. This layer chromatography indicated an approximately 40 percent yield of 21-desoxyprednisolone 17$\alpha$-propionate.

EXAMPLE 5

A suspension of zinc amalgam (2.5 g.) in dioxan (20 ml.) was stirred with cooling until freezing began, cooling was stopped, 21-desoxyprednisolone 11$\beta$-nitrate 17$\alpha$-propionate (0.5 g.) and water (0.5 ml.) were added, and the mixture was stirred at 8°–10°C. for 1 hour. Thin layer chromatograms indicated that the major product was 21-desoxyprednisolone 17$\alpha$-propionate.

EXAMPLE 6

Aluminum turnings (5 g.) were amalgamated with 5 percent aqueous mercuric chloride solution and suspended in anhydrous methanol. A suspension of 21-desoxyprednisolone 11$\beta$-nitrate 17$\alpha$-propionate (1 g.) in methanol (20 ml.) was added, reaction was initiated by addition of water (0.75 ml.) and dioxan (20 ml.) and the mixture was refluxed for 1 hour. This layer chromatograms indicated partial conversion into 21-desoxyprednisolone 17$\alpha$-propionate.

EXAMPLE 7

Prednisolone 21-methanesulphonate 11$\beta$-nitrate (5 g.), sodium iodide (5 g.) and acetone (60 ml.) were refluxed for 45 minutes and the cooled mixture was poured into water. The mixture was extracted with methylene chloride, the clear organic phase was collected, washed with water dried and evaporated to about 10 ml. The solution crystallised on cooling to 0°C. to give prednisolone 21-iodide 11$\beta$-nitrate, m.p. 175–176°C. (dec.), $[\alpha]_D^{23}$ + 138° (dioxan).

(Found: C, 49.3; H, 5.4; I, 24.3; N, 2.5. $C_{21}H_{26}INO_6$ requires C, 48.9; H, 5.1; I, 24.6; N, 2.7%).

This compound (100 mg.) in dioxan (5 ml.) was stirred with 10 percent aqueous sodium hydrogen sulphite (2 ml.) for 1½ hours at room temperature, and then poured into water. The mixture was extracted with methylene chloride, the extract was washed and dried and the solvent was evaporated. The residue was crystallised from ether to give 21-desoxyprednisolone 11β-nitrate, m.p. 142–147°C., identical with material prepared as described in Example 1.

This compound was converted into 21-desoxyprednisolone 17α-propionate as described in Example 1.

EXAMPLE 8

Prednisolone 21-bromide (2 g.) was added to acetyl nitrate prepared from acetic acid (20 ml.), acetic anhydride (16 ml.) and fuming nitric acid (4 ml.) at 0°C., the mixture was stirred at 0–9°C. for 1 hour then warmed to room temperature and stirred for 2 hours. The mixture was poured into water, extracted with methylene chloride, the extract was washed with aqueous sodium bicarbonate solution, then water, and dried. The solvent was evaporated and the residue was dissolved in chloroform and percolated through a column of Florisil. The eluate was evaporated and the residue was crystallised from methanol to give prednisolone 21-bromide 11β-nitrate, m.p. 189°–190°C., $[\alpha]_D^{21}$ + 149° (chloroform).

(Found: C, 53.7; H, 5,5; Br, 17.3; N, 3.2. $C_{21}H_{26}BrNO_6$ requires C, 53.9; H, 5.6; Br, 17.1; N, 3.0%).

This compound (884 mg.) was added to p-toluenesulphonic acid (18 mg.) in propionic anhydride (1.8 ml.), chloroform (13 ml.) was added and the mixture was refluxed overnight. The mixture was cooled, stirred for 1½ hours with water (8 ml.) and ammonium hydroxide (SG 0.88, 4 ml.) and the solvent layer was collected. It was washed with water, dried, evaporated and the residue was crystallised from acetone to give prednisolone 21-bromide 11β-nitrate 17α-propionate, m.p. 198°–200°C. (dec.), $[\alpha]_D^{21}$ + 101° (chloroform).

(Found: C, 55.1; H, 5.7; Br, 15.5; N, 2.6. $C_{24}H_{30}BrNO_7$ requires C, 55.0; H, 5.8; Br, 15.2; N, 2.7%).

This compound (200 mg.) in methylene chloride (8 ml.) was stirred with zinc dust (1 g.) at 5°–10°C. during the dropwise addition of a solution of acetic acid (0.27 ml.) in methylene chloride (2 ml.). After 10 minutes at 10°C., the solution was kept at room temperature for 10 minutes and filtered. The filtrate was washed with dilute aqueous sodium bicarbonate, then water, dried and evaporated. The residue was purified by preparative layer chromatography and crystallised from methylene chloride/ether to give 21-desoxyprednisolone 17α-propionate, m.p. 229°–231°C., identical with that prepared by the method described in Example 1.

EXAMPLE 9

A mixture of p-toluenesulphonic acid (100 mg.), propionic anhydride (10 ml.) chloroform (70 ml.) and prednisolone 21-methanesulphonate 11β-nitrate (5 g.), was refluxed for 3 days, cooled and stirred for 1½ hours with water (40 ml.) and ammonium hydroxide (SG 0.88, 20 ml.). The solvent layer was collected, washed with water, dried and evaporated. The residual gummy prednisolone 21-methanesulphonate 11β-nitrate 17α-propionate (6.6 g.) in methylene chloride (265 ml.) was stirred at 5°C. with zinc dust (33 g.) during the dropwise addition of acetic acid (9 ml.) in methylene chloride (25 ml.). After 30 minutes at 10°C. the mixture was warmed to room temperature, left at room temperature for a short time, filtered and the filtrate was washed with aqueous sodium bicarbonate and dried. The solvent was evaporated and the residue was crystallised from methanol to give prednisolone 21-methanesulphonate 17α-propionate, m.p. 134°–137°C.

A solution of prednisolone 21-methanesulphonate 17α-propionate (1 g.) in dimethylformamide (12 ml.) was heated on the steam-bath with sodium bromide (1 g.) for 7 hours, cooled, poured into water, and extracted with methylene chloride. The extract was percolated through Florisil (Registered Trade Mark). Elution was continued with 20 percent acetone in chloroform (200 ml.). The total eluate was evaporated and the residue was crystallised from acetone to give prednisolone 21-bromide 17α-propionate, m.p. 204°–205°C. (dec.), $[\alpha]_D^{23}$ + 82° (chloroform).

This compound (200 mg.) in methylene chloride (16 ml.) was stirred with zinc dust (2 g.) at 5°–10°C. during the dropwise addition of glacial acetic acid (0.54 ml.) in methylene chloride (4 ml.). After a further 10 minutes at 10°C. The mixture was warmed to room temperature for 10 minutes, cooled, filtered and the filtrate was washed with aqueous sodium bicarbonate solution and then water. The dried solution was evaporated and the residue was crystallised from acetone/hexane to give 21-desoxyprednisolone 17α-propionate identical with authentic material.

EXAMPLE 10

A solution of p-toluenesulphonic acid (100 mg.) in benzene (50 ml.) was distilled to a volume of 25 ml., 21-desoxyprednisolone 11β-nitrate (0.5 g.) and propionyl chloride (1 ml.) were added and the mixture was refluxed for 18 hours. The cooled solution was stirred with ammonium hydroxide (SG 0.88, 3 ml.) and water (12 ml.) at room temperature for 30 minutes. The benzene layer was collected, washed with water, evaporated to dryness and the residue recrystallised from ethyl methyl ketone to give 21-desoxyprednisolone 11β-nitrate 17α-propionate, m.p. 207°–209°C. (dec.), which was identical with the material prepared by the process of Example 1.

EXAMPLE 11

Prednisolone 21-iodide 11β-nitrate (2 g.) prepared as described in Example 7, was added to a solution of p-toluenesulphonic acid (40 mg.) in propionic anhydride (40 ml.), the mixture was diluted with chloroform (28 ml.) and then refluxed for 21 hours. The cooled solution was stirred with water (16 ml.) and ammonium hydroxide (SG 0.88, 8 ml.) for 15 minutes, the chloroform layer was collected washed with aqueous sodium bicarbonate, aqueous sodium bisulphite, then water, and evaporated to give crude prednisolone 21-iodide 11β-nitrate 17α-propionate.

This crude intermediate (0.8 g.) in dioxan (40 ml.) was stirred for 4 hours with 10 percent aqueous sodium bisulphite (16 ml.). The solution was diluted with water (50 ml.), seeded and the crystals were collected, washed with water and dried. The compound was recrystallised from methylene chloride/acetone to give 21-desoxyprednisolone 11β-nitrate 17α-propionate, m.p. 211°–212°C. (dec.). This compound was reduced to 21-desoxyprednisolone 17α-propionate as described in Example 1. The crude intermediate was also reduced to 21-desoxyprednisolone 17α-propionate in a single stage process using zinc dust and acetic acid.

EXAMPLE 12

1,9(11)-Bisdehydro-17α-hydroxyprogesterone (2 g.) was added to a solution of p-toluenesulphonic acid (40 mg.) in propionic anhydride (4 ml.) diluted with chloroform (28 ml.), and the mixture was refluxed overnight. The cooled solution was stirred with water (16 ml.) and ammonium hydroxide (SG 0.88, 8 ml.) for 1½ hours, the organic phase was collected, washed with aqueous sodium bicarbonate solution and then water and dried. The solvent was evaporated and the residual oil was crystallised from methanol to give 1,9(11)-bisdehydro-17α-propionoxy-progesterone, m.p. 199°–203°C., $[\alpha]_D^{24} - 30.5°$ (chloroform).

(Found: C, 75.4; H, 7.5. $C_{24}H_{30}O_4$ requires C, 75.4; H, 7.9%).

A solution of this compound (1.46 g.) in methylene chloride (25 ml.) and t-butanol (40 ml.) was treated successively at 27°C. with a solution of 72 percent perchloric acid (0.6 ml.) in water (3 ml.) and a solution of N-bromacetamide (0.65 g.) in t-butanol (10 ml.). After 15 minutes a solution of sodium sulphite heptahydrate (1.6 g.) in water (8 ml.) was added, and the mixture was poured into water. The product was extracted into methylene chloride, the solvent was evaporated at <40°C. and the residue was recrystallised from acetone/hexane to give an acetone solvate of 9α-bromo-21-desoxyprednisolone 17α-propionate m.p. 191°C. (dec.), $[\alpha]_D^{23} + 71°$ (chloroform).

(Found: C,60.3; H, 7.2; Br, 14.4. $C_{24}H_{31}BrO_5 \cdot 4/3 (C_3H_6O)$ requires C, 60.4; H, 7.1; Br, 14.4%).

A solution of the above solvated compound (520 mg.) and butane-1-thiol (1.1 ml.) in dimethylsulphoxide (17 ml.) was deoxygenated by blowing nitrogen through the solution and then stirred with chromous acetate (700 mg.) under nitrogen overnight. The purple solution was poured into ice-water (200 ml.) and extracted with methylene chloride. The extract was washed with dilute aqueous sodium bicarbonate and then water and dried. The solvent was evaporated and the residual oil was triturated with ether to give a yellow solid. This was purified by preparative thin layer chromatography and finally crystallised from methylene chloride/ether to give 21-desoxyprednisolone 17α-propionate, m.p. 231°–232.5°C., identical with that prepared by the method described in Example 1.

EXAMPLE 13

A mixture of 1,9(11)-bisdehydro-17α-hydroxyprogesterone (2.5 g.), methylene chloride (50 ml.) and t-butanol (80 ml.) was stirred at 27°C. and treated successively with 72 percent perchloric acid (1.2 ml.) in water (6 ml.), and N-bromacetamide (1.3 g.) in t-butanol (20 ml.). After 15 minutes, sodium sulphite heptahydrate (3.2 g.) in water (16 ml.) was added and the mixture was poured into water. The solid was collected, washed and dried to give 21-desoxy-9α-bromoprednisolone, m.p. 203°C. (dec.).

This compound (960 mg.) was added to a solution of p-toluenesulphonic acid (20 mg.) in propionic anhydride (2 ml.) and chloroform (14 ml.) and the mixture was refluxed for 18 hours. The suspension was filtered, the filtrate was evaporated in vacuo and light petroleum (b.p. 40°–60°C., 90 ml.) was added to the residue. The gummy solid was collected, purified by preparative thin layer chromatography and crystallised from ethyl acetate to give 21-desoxy-9α-bromoprednisolone 17α-propionate, m.p. 180°C (dec.), $[\alpha]_D^{21} + 80.5°$ (chloroform).

(Found: C, 60.4; H, 6.2; Br, 16.6 $C_{24}H_{31}BrO_5$ requires C, 60.1; H, 6.5; Br, 16.7%). It was converted into 21-desoxyprednisolone 17α-propionate as described in Example 12.

EXAMPLE 14

A mixture of prednisolone 21-methanesulphonate 17α-propionate (847 mg.), sodium iodide (847 mg.) and acetone (20 ml.) was refluxed for 70 hours, cooled and poured into water. The mixture was extracted with methylene chloride, and the extract was washed, dried and evaporated. The residual gum was purified by preparative layer chromatography and crystallised from acetone/hexane to give prednisolone 21-iodide 17α-propionate, m.p. 163°–165°C. (dec.), $[\alpha]_D^{23} + 104°$ (chloroform).

(Found: C, 55.5; H, 5.9; I, 24.1. $C_{24}H_{31}IO_5$ requires C, 54.8; H, 5.91 I, 24.1%).

A solution of this compound (40 mg.) in dioxan (2 ml.) was treated with 10 percent aqueous sodium metabisulphite (0.8 ml.) and left to stand for 2 hours. The solution was diluted with water, the solid when separated was collected and recrystallised from ether to give 21-desoxyprednisolone 17α-propionate, identical with authentic material.

EXAMPLE 15

Prednisolone 21-iodide 17α-propionate (50 mg.), prepared as in Example 14, in methylene chloride (2 ml.) was stirred at 10°–11°C. with zinc dust (250 mg.) during the dropwise addition of glacial acetic acid (0.07 ml.) in methylene chloride (0.5 ml.). After 10 minutes at 6°–9°C. the mixture was allowed to warm to room temperature, filtered and the filtrate was washed with aqueous sodium bicarbonate solution, then water and dried. The solvent was evaporated and the residue was crystallised from acetone/hexane to give 21desoxyprednisolone 17α-propionate identical with authentic material.

EXAMPLE 16

A water miscible cream was prepared containing the following ingredients (percent w/w):

| | |
|---|---|
| 21-Desoxyprednisolone 17α-butyrate | 0.1% |
| White Soft Paraffin | 15.0% |
| Cetomacrogol Emulsifying Wax | 9.0% |
| Liquid Paraffin | 6.0% |
| Chlorocresol | 0.1% |
| Water | 69.8% |

EXAMPLE 17

An ointment was prepared containing the following ingredients (percent w/w):

| | |
|---|---|
| 21-Desoxyprednisolone 17α-propionate | 0.1% |
| Methyl p-hydroxybenzoate | 0.02% |
| Butyl p-hydroxybenzoate | 0.18% |
| Wool Fat | 10.0% |
| White Soft Paraffin | to 100% |

EXAMPLE 18

An oil-in-water cream was prepared containing the following ingredients:

| | |
|---|---|
| 21-Desoxyprednisolone 17α-propionate | 0.1% |
| Cetamacrogol 1000 | 1.8% |
| Cetostearyl Alcohol | 7.2% |
| White Soft Paraffin | 15.0% |
| Liquid Paraffin | 6.0% |
| Sodium Citrate | 0.7% |
| Citric Acid | 0.5% |
| Chlorocresol | 0.15% |
| Purified Water | 68.55% |

EXAMPLE 19

Antibacterial oil-in-water creams were prepared with similar compositions to that of the cream described in Example 18, but in which:
a. 3 percent of the water was replaced by 3 percent of 5-chloro-8-hydroxy-7-iodoquinoline.
b. 0.1 percent of the water was replaced by 0.1 percent of 2-bromo-2-nitropropane-1,3-diol.
c. 1.5 percent of the water was replaced by 1.5 percent of 5,7-dichloro-8-hydroxyquinoline.
d. 0.75 percent of the water was replaced by 0.75 percent of 5,7-dichloro-8-hydroxyquinoline.
e. 0.5 percent of the water was replaced by 0.5 percent of neomycin sulphate.

EXAMPLE 20

An ointment was prepared containing the following ingredients:

| | |
|---|---|
| 21-Desoxyprednisolone 17α-propionate | 0.1% |
| Wool Fat | 10.0% |
| White Soft Paraffin | to 100% |

EXAMPLE 21

Antibacterial ointments were prepared with similar compositions to that of the ointment described in Example 20 and containing also 0.1 percent of 2-bromo-2-nitropropane-1,3-diol, 0.75% or 1.5 percent of 5,7-dichloro-8-hydroxyquinoline 3 percent of 5-chloro-8-hydroxy-7-iodoquinoline or 0.5 percent of neomycin sulphate.

EXAMPLE 22

An ear drop was prepared by dissolving 21-desoxyprednisolone 17α-propionate 0.1 percent w/w in propylene glycol.

EXAMPLE 23

An aerosol spray was prepared by dissolving 21-desoxyprednisolone 17α-propionate in industrial methylated spirit and hexylene glycol and adding chlorofluoroalkane propellants to give a composition containing the following ingredients:

| | |
|---|---|
| 21-Desoxyprednisolone 17α-propionate | 0.1% |
| Industrial Methylated Spirit | 29.9% |
| Hexylene Glycol | 10.0% |
| Freon 11 | 30.0% |
| Freon 12 | 30.0% |

EXAMPLE 24

An aerosol quick-breaking foam preparation was prepared containing the following ingredients:

| | |
|---|---|
| 21-Desoxyprednisolone 17α-propionate | 0.1% |
| Polawax | 0.3% |
| Industrial Methylated Spirit | 49.6% |
| Hexylene Glycol | 10.0% |
| Purified Water | 30.0% |
| Freon 12 | 6.0% |
| Freon 114 | 4.0% |

We claim:
1. A therapeutic composition in a form suitable for topical administration which comprises an anti-inflammatory effective amount of a compound of the formula

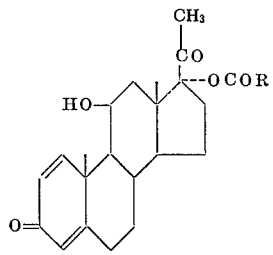

in which R is a member selected from the group consisting of ethyl, n-propyl and isopropyl, in association with a pharmaceutically acceptable carrier.

2. A therapeutic composition according to claim 1 in which R is ethyl.

3. A method of treating a topical inflammatory condition which comprises the topical application to a subject suffering from said topical inflammatory condition of an anti-inflammatory effective amount of a compound of the formula

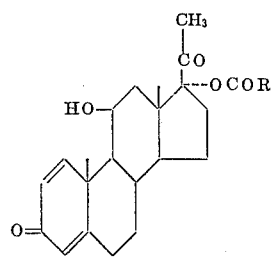

in which R is a member selected from the group consisting of ethyl, n-propyl and isopropyl.

4. A method according to claim 3 in which R is ethyl.

5. A therapeutic composition according to claim 1 in the form of a solution.

6. A therapeutic composition according to claim 1 in the form of a suspension.

7. A therapeutic composition according to claim 1 in the form of a cream.

8. A therapeutic composition according to claim 1 in the form of an ointment.

* * * * *